United States Patent Office 2,919,256
Patented Dec. 29, 1959

2,919,256

PROCESS FOR PREPARING RUBBER COMPOSITIONS CONTAINING CLAY HAVING ADSORBED PETROLEUM HYDROCARBONS

Charles W. Wallgren, Ridley Park, Pa., assignor to Sun Oil Company, Philadelphia, Pa., a corporation of New Jersey No Drawing. Application December 15, 1955
Serial No. 553,189

4 Claims. (Cl. 260—28.5)

This invention relates to natural and synthetic rubber compositions containing clay as a filler, and more particularly to the use of clay from a particular source as the filler.

Clays have certain beneficial properties as fillers for natural and synthetic rubbers. The abrasion resistance of rubber is generally improved by the incorporation of clay therein, and in some cases the stiffness of the composition is also improved. There are two generally recognized types of clay for use in rubber compositions, i.e. hard and soft clays, and both types provide beneficial properties of various kinds, depending upon the use to which the rubber composition is to be put.

According to the present invention rubber compositions are provided wherein clay from a particular source is employed as a filler material. The clay employed is one which has been used to treat petroleum materials such as oil or wax and which contains adsorbed thereon petroleum materials derived from the original petroleum treated. It has been found that rubber compositions containing such clays have beneficial properties, and they can be used in various applications of rubber compositions. In most instances, the used clay is dark colored and therefore unsuitable for the preparation of rubber compositions which require a light color; however, they are entirely satisfactory for use in rubber compositions which are not required to be light colored. Suitable uses of such compositions include floor coverings, battery cases, etc.

The invention is applicable to natural and synthetic rubbers generally. The synthetic rubbers employed are usually polymers of butadiene, either alone or copolymerized with other monomers as well known in the art, for example styrene, vinyl naphthalene, acrylic acid, methyl acrylate, methyl methacrylate, acrylonitrile, isobutylene, methyl vinyl ether, methyl vinyl ketone, vinylidene chloride, etc. Instead of butadiene itself, substitution products thereof can be employed such as isoprene, chloroprene, 2,3-dimethyl butadiene, etc. Mixtures of the various monomers can be employed if desired.

The invention is applicable to the recently developed high Mooney rubbers as well as to the previous polymers of lower Mooney viscosity; thus for example the rubber employed according to the present invention can have a raw Mooney viscosity of at least 80 and for example up to 200, as well as raw Mooney viscosity of less than 80.

According to the present invention, clay which has been used to treat petroleum is added to natural or synthetic rubber at any convenient stage of the processing of the rubber. Thus for example it may be added to the rubber either before or after coagulation of the latex. Where the addition is performed before coagulation, the coagulation is carried out in the presence of the added clay.

The presence of used clay in the rubber compositions according to the invention permits reduction of the amount of added plasticizer such as mineral oil required for suitable properties. Thus, highly satisfactory properties are obtained in some instances without any added plasticizer, the hydrocarbons in the clay apparently providing sufficient plasticizing properties without assistance from further amounts of plasticizer; it is within the scope of the invention, however, to provide additional plasticizer if needed or desired. The invention is advantageous in that the hydrocarbons retained by the clay have highly satisfactory plasticizing properties and are generally superior to the original petroleum fraction prior to the clay treating, since they generally are more aromatic and naphthenic in character than the original fraction.

Any suitable type of clay can be employed according to the present invention. Suitable types include montmorillonite, attapulgite, bentonite, fuller's earth, kaolin, etc. Acid activated clays can be employed if desired; however clays which have not been acid activated are also suitable. The clay used can be acidic, basic or neutral. Either hard or soft clays, according to the recognized classification of the rubber art, can be employed.

The clay employed can be any suitable size, though preferably a major proportion of the clay particles are smaller than 200 mesh, and more preferably substantially all of the particles are smaller than 200 mesh. Particle sizes less than 325 mesh are particularly preferred. The clay can be used to prepare rubber compositions without any further reduction in size after having been used to treat petroleum. In this case the particle size of the clay is preferably in the range from 200–400 mesh, and the clay ordinarily will have been used to treat petroleum according to the contact filtration procedure. It is also within the scope of the invention to employ relatively large clay particles to treat petroleum, then subject the clay to treatment for reduction in size, e.g. by grinding, before using the clay in the preparation of rubber compositions.

The clay which is employed can have been used to treat any suitable type of petroleum fraction, and the treatment can have been conducted with the petroleum material in either liquid or vapor phase. The result of the clay treatment is generally, to some extent, to adsorb constituents of the petroleum charge on the clay surfaces, and there is also generally some reaction of petroleum constituents, e.g. by polymerization, to form reaction products which become adsorbed on the clay surfaces. The polymerization mechanism is particularly pronounced in the case of treating cracked gasoline in order to remove gum forming constituents; however this mechanism is also involved to some extent in the treatment of higher boiling petroleum fractions such as lubricating oils.

In one embodiment of the invention, the clay which is employed is one which has been used to treat petroleum wax, and which has adsorbed thereon wax or both wax and oil. In this embodiment the wax in the clay produces beneficial properties with regard to the prevention of checking of the rubber composition upon exposure to aging conditions. In this embodiment, the petroleum material which is treated may be an oil containing a small proportion of wax, the wax being adsorbed at least in part on the clay during the treatment. The wax which is treated in this embodiment can be any type of petroleum wax, e.g. paraffin wax, microcrystalline wax, etc.

Preferably, clay is employed in the rubber compositions according to the invention in amounts ranging from 10 to 110 parts by weight per 100 parts of rubber, and preferably the amount of petroleum material in the composition is within the range from 5 to 50 parts per 100 parts of rubber. The proportions of clay given are on the petroleum-free basis, and the proportions of petroleum material refer to that petroleum material which is adsorbed on the clay employed. Suitable amounts of clay or other filler which is free from petroleum material can additionally be incorporated in the composition if desired. Also, suitable amounts of clay-free petroleum oil or other plasticizer can be used in the composition in addition to the used clay, depending upon the properties which are desired. Preferably, the total amounts of filler and plasticizer are within the approximate range from 10 to 125 parts, and 5 to 75 parts, respectively, per 100 parts of rubber.

One manner of operation according to the invention involves formation of a suspension of clay in water, using a stabilizing agent or peptizer, e.g. alkali metal hydroxide, silicate, phosphate, soap, etc. in amount ranging from 1 to 10% based on the clay suspension. The aqueous clay suspension is then mixed with latex produced by any conventional emulsion polymerization procedure to form a suspension of latex solids and clays in water. This suspension should be alkaline generally in order to avoid premature coagulation of the latex. The suspension is then coagulated by means of 0.1 to 5 weight percent for example of a known coagulating agent for latex suspension, e.g. aluminum sulfate, zinc sulfate, zinc chloride, magnesium sulfate, magnesium chloride, calcium chloride, sulfuric acid, hydrochloric acid, mixtures of a strong acid and a salt, e.g. sulfuric acid and sodium chloride, etc. The coagulation is usually carried out at a temperature within the range from room temperature to 160° F. The coagulated latex containing clay and petroleum material can then be further processed according to known procedures, employing known additional compounding ingredients.

The following examples illustrate the invention:

*Example I*

The following composition was prepared:

| | Parts by weight |
|---|---|
| Butadiene-styrene copolymer (raw Mooney viscosity about 175) | 100 |
| Zinc oxide | 5 |
| 2-mercaptobenzothiazol | 1.75 |
| Copper diethyl dithiocarbamate | 0.5 |
| Used clay | 66.7 |
| Stearic acid | 3 |
| Sulfur | 2 |

The clay had been used to refine a heavy petroleum fraction having Saybolt Universal viscosity at 210° F. of about 100. The fraction was prepared by furfural refining of a distillate from naphthenic base crude to obtain a 79% raffinate and treatment of the raffinate with 10 pounds per barrel of concentrated sulfuric acid. The fraction was then treated at 300° F. with 30 pounds per barrel of Attapulgus contact clay to obtain a refined oil having improved color and electrical resistivity for use as a cable oil. The used clay, containing about 50 weight percent of oil, based on total clay, was employed in the above-described rubber composition.

The rubber composition was milled on a conventional rubber mill at a temperature of about 150° F. The resulting compound was cured for 10 minutes at 292° F. to produce a uniformly dark-colored rubber sheet having tensile strength of 400 pounds per square inch, modulus at 300° F. of 300, and elongation of 380%.

Another composition was prepared having the same proportions of materials, except that it also contained 56.5 parts of a rubber grade of carbon black. This composition cured at 315° F. for 15 minutes to give a uniformly dark-colored sheet having tensile strength of 1600 p.s.i.

This example shows that clay which has been used to treat petroleum, and which contains petroleum hydrocarbons, can be used as sole filler and plasticizing material in butadiene-styrene rubber compositions to produce compounded rubber having good properties, and that the used clay can be used with carbon black as additional filler to produce compounded rubber having still better tensile strength.

*Example II*

The following is an example of a manner in which used clay can be added to rubber latex prior to coagulation:

100 grams of used clay are admixed with 100 grams of water, 5 grams of oleic acid and 1 gram of sodium hydroxide, and the mixture is stirred for 10 minutes to produce an aqueous suspension of the clay. About 10 percent of the clay settles out on standing. The clay suspension including the settled clay is then stirred into 600 grams of synthetic latex obtained by emulsion polymerization of butadiene and styrene. The latex contains about 23.5% of butadiene-styrene polymer having raw Mooney viscosity of about 175. The latex suspension is coagulated by the addition of 300 cc. of water containing 36 grams of sodium chloride and 6 grams of concentrated sulfur acid. A homogeneous coagulated polymer containing clay and petroleum material uniformly dispersed throughout is obtained as a result of the coagulation. The coagulated polymer can be further processed according to known procedures.

The invention claimed is:

1. Process for preparing rubber compositions which comprises admixing (1) rubber selected from the group consisting of natural rubber, synthetic homopolymers of conjugated dienes, and synthetic ocpolymers of conjugated dienes and ethylenically unsaturated monomers and (2) clay which contains adsorbed petroleum hydrocarbons and which has been previously obtained by contacting clay with petroleum material selected from the group consisting of petroleum lubricating oil and petroleum hydrocarbon wax and subsequently separating refined petroleum material from clay containing petroleum hydrocarbons selectively adsorbed by the clay from the petroleum material during said contacting, the amount of clay in the resulting mixture with rubber being in the approximate range from 10 to 110 parts by weight per 100 parts of rubber, and the amount of petroleum hydrocarbons in said resulting mixture being within the approximate range from 5 to 50 parts by weight per 100 parts of rubber.

2. Process according to claim 1 wherein said clay has particle size within the approximate range from 200 to 400 mesh, and said separating is performed by filtering the clay from a slurry thereof in the petroleum material.

3. Process according to claim 1 wherein said clay, subsequently to said separating, is reduced in size to with the approximate range from 200 to 400 mesh prior to admixing with said rubber.

4. Process according to claim 1 wherein said rubber is a rubbery copolymer of butadiene and styrene.

References Cited in the file of this patent

UNITED STATES PATENTS

| | | |
|---|---|---|
| 2,196,570 | Walters | Apr. 9, 1940 |
| 2,415,541 | Soday | Feb. 11, 1947 |
| 2,689,841 | Augustin | Sept. 21, 1954 |
| 2,702,286 | Iknoyan | Feb. 15, 1955 |